United States Patent [19]

Groendal et al.

[11] Patent Number: 5,330,219
[45] Date of Patent: Jul. 19, 1994

[54] FLEXIBLE AND FOLDING BICYCLE

[75] Inventors: Mark L. Groendal, Kentwood; Richard D. Vaughn, Jenison; Ricky A. Engvall, Rockford, all of Mich.

[73] Assignee: Greendale Bicycle Company, Grand Rapids, Mich.

[21] Appl. No.: 121,040

[22] Filed: Sep. 13, 1993

[51] Int. Cl.$^5$ .......................... B62K 3/04; B62K 15/00
[52] U.S. Cl. .................... 280/275; 280/278; 280/283
[58] Field of Search .............. 280/275, 278, 281.1, 280/274, 283

[56] References Cited

U.S. PATENT DOCUMENTS

| 433,172 | 7/1890 | Jett | 280/275 X |
|---|---|---|---|
| 441,649 | 12/1890 | Dunlop | 280/275 |
| 453,514 | 6/1891 | Shier | 280/275 |
| 463,710 | 11/1891 | Mathews | 280/275 |
| 505,753 | 9/1893 | Cocken | 280/275 |
| 591,306 | 10/1897 | Tolson | 280/283 |
| 602,034 | 4/1898 | Murphy | 280/266 |
| 701,967 | 6/1902 | Titus | 280/283 |
| 1,045,025 | 11/1912 | Heroguez | 280/283 |
| 2,187,238 | 1/1940 | Judd | 280/283 |
| 2,264,981 | 12/1941 | Jencick | 280/283 |
| 3,990,717 | 11/1976 | Best | 280/278 |
| 4,162,797 | 7/1979 | McBride | 280/275 |
| 4,202,561 | 5/1980 | Yonkers | 280/278 |
| 4,669,747 | 6/1987 | Groendal | 280/283 |
| 4,792,150 | 12/1988 | Groendal et al. | 280/275 |
| 4,838,569 | 6/1989 | Ford | 280/275 |
| 5,080,384 | 1/1992 | Groendal et al. | 280/275 |
| 5,149,119 | 9/1992 | Hwang | 280/275 |
| 5,222,751 | 6/1993 | Chen | 280/278 |

FOREIGN PATENT DOCUMENTS

| 110943 | 5/1927 | Fed. Rep. of Germany . |
| 839312 | 6/1938 | France . |
| 12901 | 5/1887 | United Kingdom . |

OTHER PUBLICATIONS

Exhibit A discloses three product brochures published by Greendale Bicycle Co., the assignee of the present application, advertising an early version of the flexible bicycle, the publication date being over one year prior to filing the present application.

Exhibit B discloses another product brochure published by Greendale Bicycle Co. advertising another version of the flexible bike, the publication date being later than the filing date of the present invention.

Exhibit C is a close-up photograph of the spring plate and a quick release bolt-type connector used on flexible bicycles which were sold by Greendale Bicycle Co. over one year ago.

Primary Examiner—Margaret A. Forcarino
Assistant Examiner—Kevin Hurley
Attorney, Agent, or Firm—Price, Heneveld, Cooper, Dewitt & Litton

[57] ABSTRACT

A bicycle frame includes a front frame having a cross bar, a rear frame including a center post, and a leaf-spring-like flexible plate interconnecting the cross bar to the center post. A shock-absorbing member is pivotally secured at its ends to the front end of the cross bar and to the bottom of the center post in a triangular arrangement. The shock-absorbing member includes a coil spring that stores energy as the shock absorber member is extended in a first direction and the frame is expanded, which energy is returned to the bicycle frame upon relaxation of the coil spring. However, the shock-absorbing member is substantially incompressible in the opposite direction so that it prevents the front and rear frames from collapsing undesirably. This also allows forces to be transmitted from the front frame to the rear frame through the shock-absorbing member in the second opposite direction thus taking some stress off of the flexible plate. The rear frame includes a fixed portion including an upper center post, and a rotatable portion rotatably axially mounted in the upper center tube. The rotatable portion can be pivoted around the upper center post to a compact storage position adjacent the front frame. This provides a compact arrangement of the bicycle that is more easily shipped and/or stored.

28 Claims, 3 Drawing Sheets

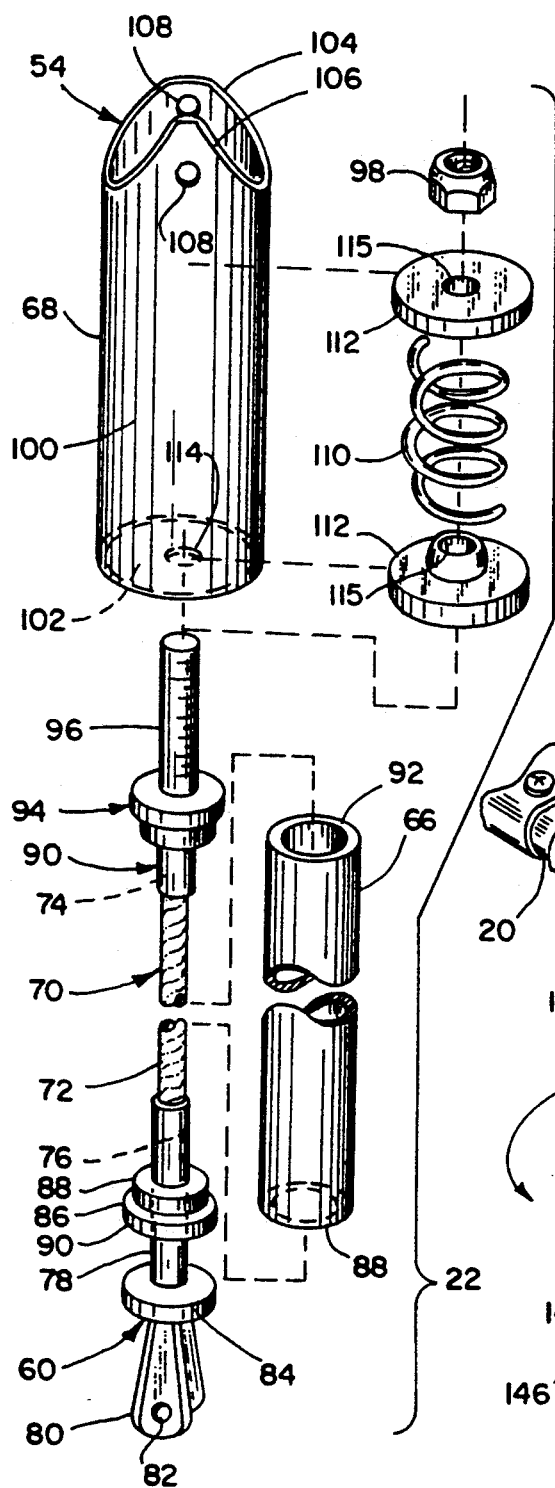
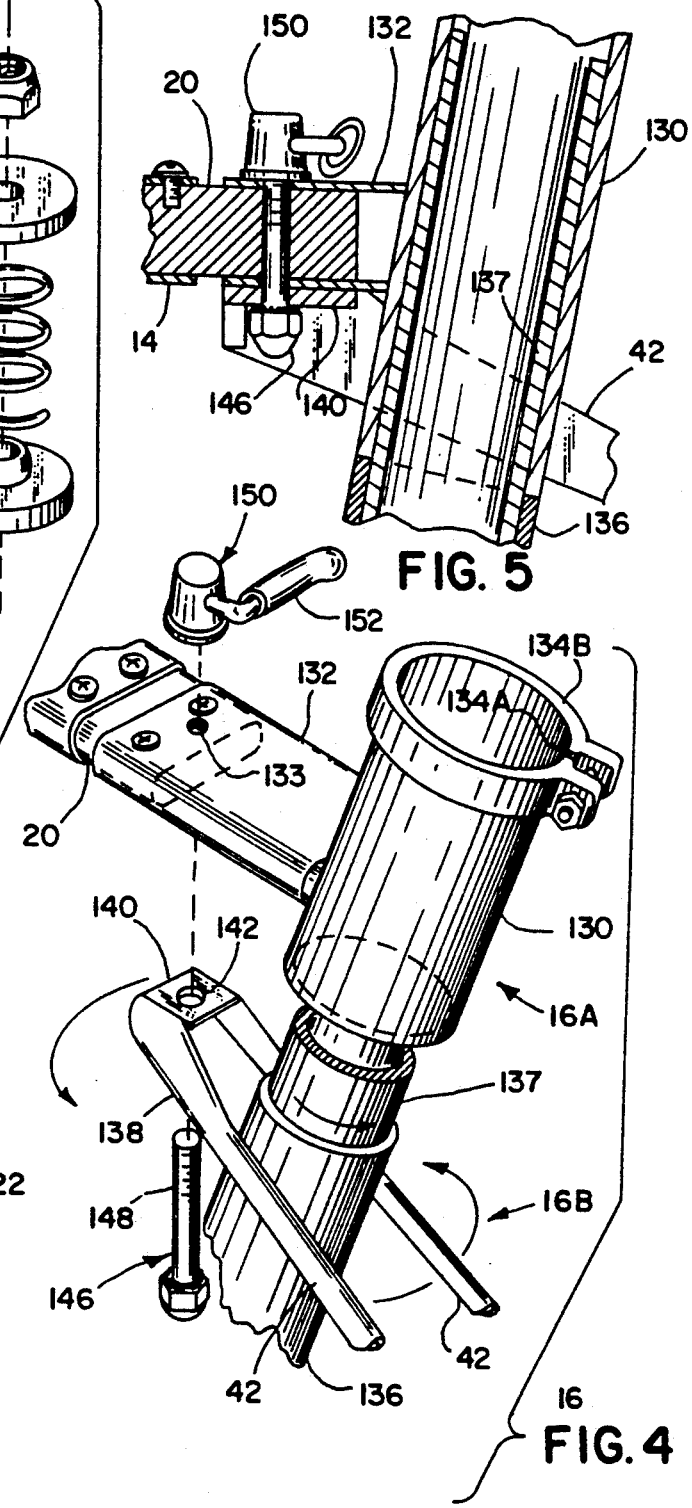
FIG. 3
FIG. 5
FIG. 4

FLEXIBLE AND FOLDING BICYCLE

BACKGROUND OF THE INVENTION

The present invention concerns bicycles, and in particular concerns a bicycle frame having improved construction for better handling of shocks from rough terrain when using the bicycle and also improved construction to facilitate compact shipping and storing of the bicycle.

Conventional bicycles comprise a rigid frame including a center post in which a seat is mounted, a top cross bar rigidly connected to the center post near the top thereof and extending forwardly to a front journal tube in which the separate front wheel frame or fork is rotatably journaled, and a bottom cross bar which extends upwardly and forwardly from the bottom of the center post, usually from the crankshaft hub mounted at the bottom of the center post to the front journal hub at a point just below the top cross bar. The center post, top cross bar and bottom cross bar define the three legs of a rigid structural triangle.

In a revolutionary new bicycle disclosed in U.S. Pat. No. 4,669,747 and in improvement U.S. Pat. Nos. 4,792,150 and 5,080,384, the foregoing rigid triangularly-shaped frame member is eliminated. The bottom cross bar is eliminated all together and provisions for a flexible spring connection between the top cross bar and the center post are made. One or more tension cables extend from the front portion of the frame, near the front of the top cross bar, downwardly to a point at the rear portion of the frame near the bottom of the center post. This construction is especially well adapted to dirt bike racing and/or mountain bike racing in that the frame itself is designed to absorb the shocks of rough riding. Further, when pedaling torque spreads the frame, a second spring operably connected to the tension cable is compressed. At the end of the pedal stroke, the second spring relaxes and drives the crank upward for an extra kick when the pedals are on the upstroke part of their travel.

A problem has been that the tension cable, due to its non-rigid construction, can only control the flexural movement that results when the frame is spread. When the frame collapses (i.e. when the front and rear bicycle wheels move toward each other) the bending of the flexible spring connection is limited only by the strength of the flexible spring connection itself. Experience has shown that it is desirable to limit and/or control the flexural movement of the flexible spring connection in both directions. Further, testing has shown that it is desirable to transmit shocks from the front of the frame to the rear of the frame other than only through the flexible spring connection.

Aside from controlling the flexing movement of the frame during operation of the bicycle, there is a need to be able to easily reduce the bicycle frame to a compact arrangement for shipment and/or storage so that the bicycle can be more easily transported from place to place, such as in order to compete in races. Further, avid bikers are desirous of transporting the bike on vacations and other excursions. It is known to provide "quick release" wheels that can be quickly removed from a bicycle frame, however further reduction in the net size of the frame itself is desired so that freight/shipping costs are reduced.

Thus an improved bike frame solving the aforementioned problems is desired.

SUMMARY OF THE INVENTION

In one aspect, the present invention includes a bicycle having a rear frame member with a generally vertical center post and a front frame member with a generally horizontal cross bar member, both of which are positioned within an imaginary generally vertical plane extending along a longitudinal axis. A spring plate flexibly interconnects the front and rear frame members so as to allow vertical/rotational relative movement of the frame members within the generally vertical longitudinal plane about the spring plate, the spring plate being configured so as to minimize relative movement of the frame members out of the generally vertical longitudinal plane. A shock-absorbing member is operably connected between the front and rear frame members and spaced from the spring plate, the shock-absorbing member being configured to limit the vertical/rotational relative movement between the frame members in a first direction about the spring plate but being configured to permit a range of the vertical/rotational relative movement between the frame members in a second direction opposite the first direction.

In another aspect, the bicycle rear frame includes a fixed portion and a rotatable portion. The fixed portion includes a tubular member defining a part of the center post, the rotatable portion includes rear wheel supporting members for supporting the rear wheel of the bike and means axially rotatably engaging the tubular member for rotatably mounting the rotatable portion to the fixed portion so that the fixed portion can be moved between a use position whereat the front and rear wheels are aligned longitudinally, and a collapsed position whereat the front and rear wheels are collapsed to a non-aligned compact position that facilitates transporting and storing the bicycle.

These and other features, advantages and objects of the present invention will be further understood and appreciated by those skilled in the art by reference to the following specification, claims and appended drawings.

BRIEF DESCRIPTION OF THE DRAWINGS

FIG. 3 is an exploded perspective view of the shock absorbing member shown in FIG. 2;

FIG. 4 is a fragmentary exploded perspective view of the center post shown in FIG. 2;

FIG. 5 is a side cross-sectional view of the center post shown in FIG. 2;

DETAILED DESCRIPTION OF THE PREFERRED EMBODIMENT

Figure 1:
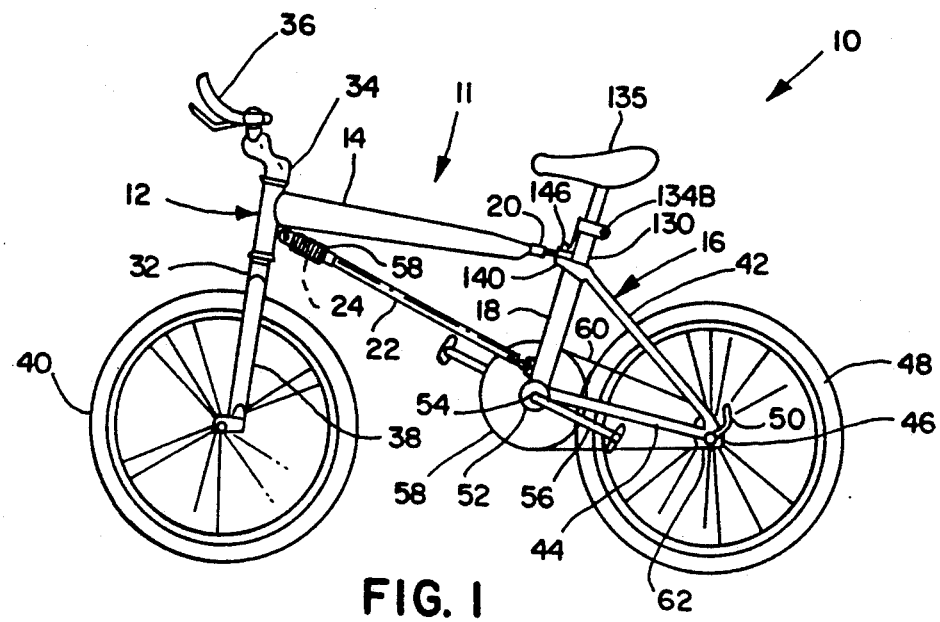
FIG. 1 is a side view of a bicycle embodying the present invention.

A bicycle 10 (FIG. 1) embodying the present invention includes a novel bicycle frame 11 having a front frame 12 with a cross bar 14, a rear frame 16 with a center post 18, a leaf-spring-like flexible plate 20 interconnecting the cross bar 14 to the center post 18, and a shock-absorbing member 22 pivotally secured at its ends to the cross bar 14 and to the center post 18 in a triangular arrangement with the cross bar 14 and the center post 18. The shock-absorbing member 22 is extendable and includes a coil spring 24 that stores energy as the shock absorber member 22 is extended (i.e. when the bicycle frame 11 is expanded or spread), which energy is returned to the bicycle frame 10 upon relaxation of the coil spring 24 for an extra kick (i.e. when the frame 11 returns to its unflexed position). However, the shock-absorbing member 22 is substantially incompressible, thus preventing the front and rear frames 12 and 16 from moving beyond a predetermined collapsed position. Thus, the shock-absorbing member 22 controls the flexing of bicycle frame 11 giving improved performance of bicycle 10.

Front frame 12 (FIG. 1) includes a journal tube 30 attached to the front end of cross bar 14. A front-wheel-supporting fork 32 includes an upper post 34 rotatably mounted in journal tube 30 and a downwardly extending forked end 38. Handle bars 36 are secured to the upper end of fork 32. Front wheel 40 is operably secured to the lower ends of forked end 38 between the arms of forked end 38.

Rear frame 16 (FIG. 1) includes center post 18, and a pair of upper and lower rear-wheel-supporting braces 42 and 44 that extend rearwardly from the top and bottom of center post 18, respectively. Braces 42 and 44 interconnect at a rear axle location 46. Rear wheel 48 is secured to location 46 by a quick release mechanism 50.

A crank mechanism housing 52 is welded to the bottom of center post 18. A pedaling mechanism 54 is operably secured in crank housing 52, and includes pedals 56 and shiftable multi-sprocket gearing 58. Bicycle chain 60 extends from pedaling mechanism 54 to multi-sprocket gearing 62 on rear wheel 48.

The cross bar 14 and spring plate 20 are described in detail in U.S. Pat. Nos. 4,669,747, 4,792,150 and 5,080,384. A detailed description is not necessary for an understanding of the present invention, and thus further discussion of these members is accordingly abbreviated hereinafter. However, it is noted that spring plate 20 functions in a leaf-spring-like manner to allow relative vertical/rotational flexing movement between the front and rear frames 12 and 16 about spring plate 20.

One aspect of the present invention focuses on shock-absorbing member 22. Shock-absorbing member 22 acts as a bracing member and a flex-limiting member, as described hereinafter. More particularly, shock-absorbing member 22 is configured to cushion but abruptly limit the collapsing of front and rear frames 12 and 16 about spring plate 20 (i.e. limit the relative movement of the front and rear wheels 40 and 48 toward each other). Shock-absorbing member 22 is also configured to allow controlled spreading of the front and rear frames 12 and 16 over a range of movement (i.e. allow limited relative movement of the front and rear wheels 40 and 48 away from each other). Shock-absorbing member 22 (FIG. 2) includes a U-shaped front connector end 54 for pivotally connecting to a flange 56 on front frame 12, flange 56 being located under the juncture of journal tube 30 and cross bar 14 at the front end of cross bar 14. A boot 58 covers the front end of shock-absorbing member 22 including connector end 54 for aesthetics. Shock-absorbing member 22 further includes a U-shaped rear connector end 60 for pivotally connecting to a flange 62 on rear frame 16, flange 62 being located at the lower end of center post 18 adjacent crank mechanism housing 52.

It is contemplated that shock-absorbing member 22 can be any of a number of different constructions. In the preferred form, shock-absorbing mechanism 22 (FIG. 3) includes a long tube 66 and an axially aligned short tube 68. A cable assembly 70 is positioned in long tube 66. Cable assembly 70 includes a tension cable 72 having ends 74 and 76. Rear end 76 is secured to a rigid elongated connector 78 that terminates in the U-shaped rear connector end 60 noted previously. U-shaped rear connector end 60 includes parallel flanges 80 with holes 82 therein for receiving a pivot pin (not shown) to secure U-shaped rear connector end 60 to flange 62 on rear frame 16. A rigid washer 84 forms the base of connector 78. An elastomeric grommet 86 made of urethane or rubber is positioned on connector 78 between rigid washer 84 and the rear terminal end 88 of tube 66. Grommet 86 includes a protruding position 88 that fits into terminal end 88, and a flange portion 90 that abuts the end of tube 66. Grommet 86 is made of a resilient material so that it cushions but transmits energy from tube 66 to rear frame 16 when shocks are incurred.

The front end 74 of cable 72 includes a connector 90. Connector 90 projects from the front terminal end 92 of tube 66. A grommet 94 comparable to grommet 86 is positioned in the front end 92 of tube 66. Connector 90 includes a threaded projecting shaft 96 that is adapted to receive a self-locking nut 98.

Short tube 68 includes a sleeve 100 and a flat plate 102 welded on one end of sleeve 100. The end of short tube 68 opposite flat plate 102 includes flanges 104 and 106 having transversely oriented holes 108 therein. Flanges 104 and 106 define U-shaped front connector end 54 of shock-absorbing member 22 and have a crown-like shape configured to straddle the junction of cross bar 14 and journal tube 30. Holes 108 are located so as to mateably receive a pivot pin connecting short tube 68 to flange 56 of front frame 12.

A coil spring 110 is positioned in short tube 68, and spring-end-engaging washers 112 are also positioned in short tube 68 on both ends of spring 110. It is contemplated that coil spring 110 could be replaced with a rubber-type spring or gas spring. Front cable connector 90 projects through a hole 114 in a flat plate 102 and through holes 115 in washers 112, and spring 110. Nut 98 is threaded onto threaded projecting shaft 96 to retain the assembly together, thus retaining shock-absorbing member 22 together in a unit. Rubber boot 58 (FIG. 2) covers short tube 68 (FIG. 3) plus extends a short distance onto long tube 66.

To assemble bicycle frame 11, a coil spring 110 of the desired strength is selected and assembled into short tube 68. Long tube 66, short tube 68, and cable assembly 70 are then assembled together along with grommets 86 and 94 to form shock-absorbing member 22. Self-locking nut 98 is tightened as desired to pretension coil spring 110. Shock-absorbing member 22 is then pivotally attached to bicycle frame 11 by pivot pins that secure front connector end 54 to front flange 104/106 on front frame 12 and rear connector end 60 to rear flange 62 on rear frame 16. As thus assembled, coil spring 110 is compressed whenever bicycle frame 10 is spread. This typically occurs during the power portion of the pedaling stroke by a biker. As the biker approaches the weaker portion of the pedalling stroke, coil spring 110 decompresses and "kicks" energy back into the bicycle 10. This spreading of the frame can also be due to other factors, such as when a small rock or ground depression is encountered by the front or rear wheels 40 and 48. If a larger rock or depression is incurred, front wheel 40 may be jarred rearwardly, thus causing the bicycle frame to collapse. In this case, the shock-absorbing member 22 is compressed as front and rear frames 12 and 16 tend to move toward each other about flexible spring plate 20. This causes short tube 68 and long tube 66 to compress against each other and against grommets 86 and 94. The sharpness of the impact is thus absorbed or dampened, however, the compressive distance/movement is limited and the force of impact is thus communicated through shock-absorbing member 22 from front frame 12 to rear frame 16. Notably, shock-absorber 22 is replaceable along with spring plates 20. Thus, various bikes 10 tailor-made to a particular biker's characteristics and/or desires are possible with only a limited number of extra parts. It is also noted that the spring plate can be pretensioned by shock-absorbing member 22.

Another innovative feature of bicycle 10 it is collapsibility which allows compact storage and shipment. Rear frame 16 (FIG. 4) includes a stationary of fixed portion 16A including an upper tubular center post 130. Upper center post 130 includes an oblong tubular connector 132 for connecting to one end of spring plate 20. A hole 133 extends generally normally through connector 132. The top of upper center post 134 is slotted with a slot 134A that extends a short distance longitudinally, and a collar 134B is located at the top of center post 18. Collar 134B is tightenable to secure a seat 135 (FIG. 1) at a desired height in upper center post 130.

Rear frame 16 further includes a movable or rotatable portion 16B defined by a lower center post 136 axially aligned with and abutting the upper center post 130. A reinforcement tube 137 is secured in lower center post 136 such as by press-fitting or welding/brazing. Reinforcement tube 137 extends upwardly several inches above lower center post 136, and extends slidingly, rotatingly but snugly into the bottom of upper center post 130. Upper and lower center posts 130 and 136 combine to form center post 18.

Rear wheel supporting upper braces 42 are secured to opposite sides of lower center post 130. Braces 42 include protruding ends 138 that protrude forwardly of lower center tube 136. A flat section 140 connects protruding ends 138. Flat section 140 includes a hole 142. The movable portion 16B of rear frame 16 is rotatable on the stationary portion 16A of rear frame 16 so that the lower center post 136 rotates in upper center post 130 until hole 142 aligns with hole 133 in connector 132. With holes 133 and 142 aligned, front and rear wheels 40 and 48 are perfectly aligned so that the bicycle 10 can be used. A headed bolt or quick connecting fastener 146 can be extended through holes 133 and 142 with bolt threads 148 protruding past oblong connector 132 to secure bicycle frame 11 in this use position. A quick attach nut 150 can then be threaded onto threads 148. Quick attach nut 150 is of a type known in the bicycle industry. Nut 150 includes an internal nut (not specifically shown) that can be threaded part way onto threads 148 such that the internal nut is still loose. A handle 152 on nut 150 is connected to a cam (not specifically shown) that operably engages the internal nut. Handle 152 can be rotated causing the cam to wedge against connector 132 and the internal nut, thus tensioning bolt 146. In other words, the movement of handle 152 is designed to allow quick attachment and tensioning of the bolt without the use of separate tools and in an efficiently quick manner.

Figure 2:
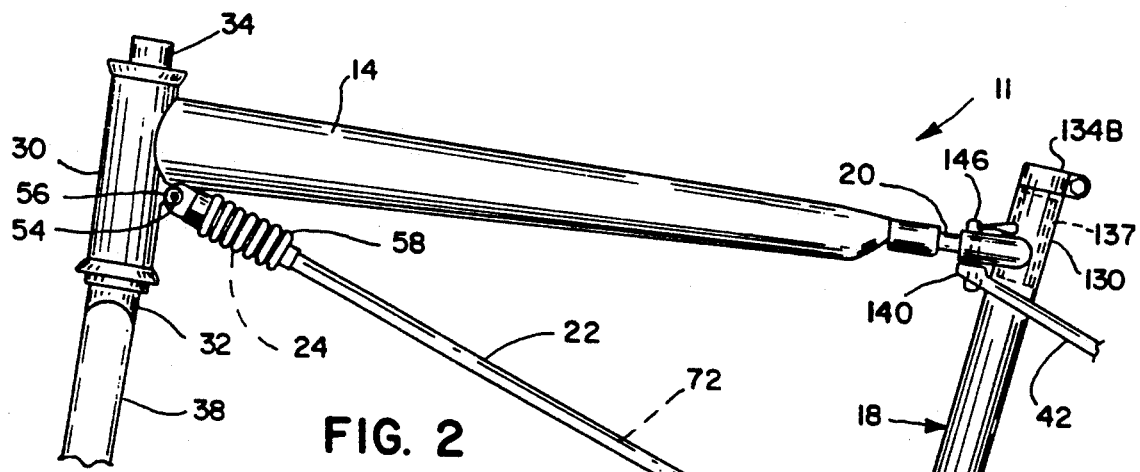
FIG. 2 is an enlarged fragmentary side view of the bicycle frame shown in FIG. 1.
Figure 9:
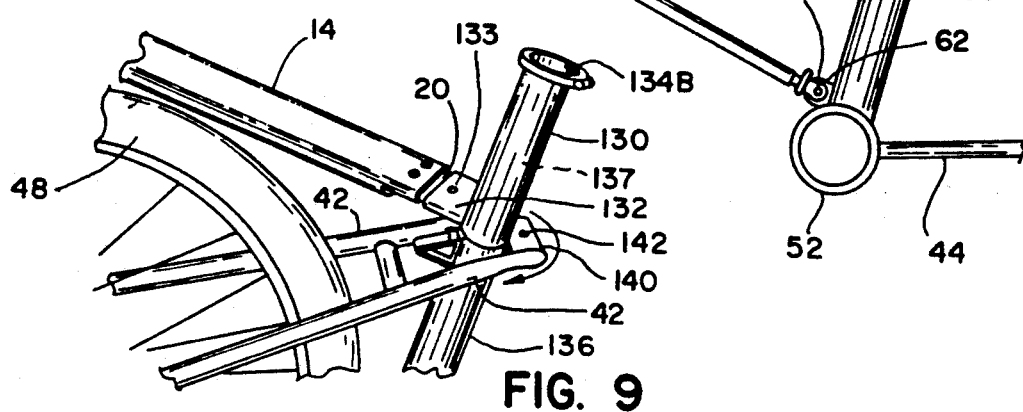
FIG. 9 is a partial perspective view of the bicycle frame in the collapsed position as shown in FIG. 8.
Figure 6:
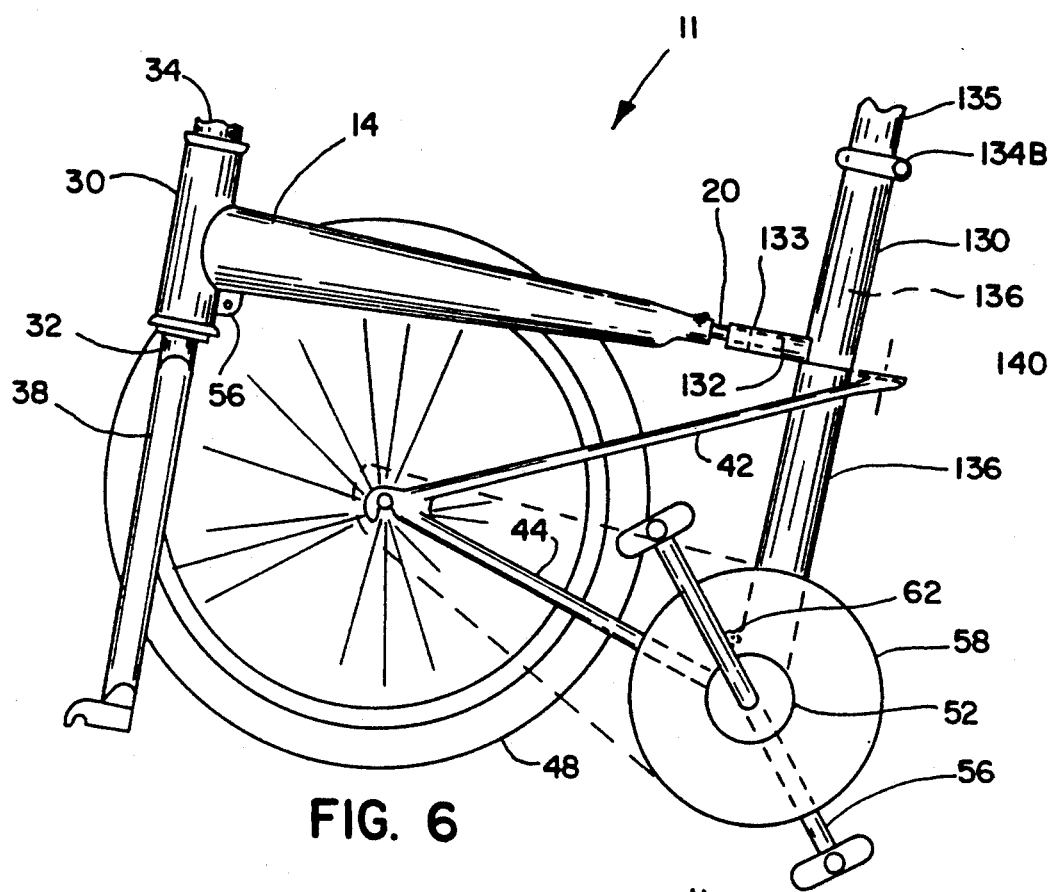
FIG. 6 is a side view of the bicycle frame shown in FIG. 1, the frame being pivoted to the collapsed position.
Figure 7:
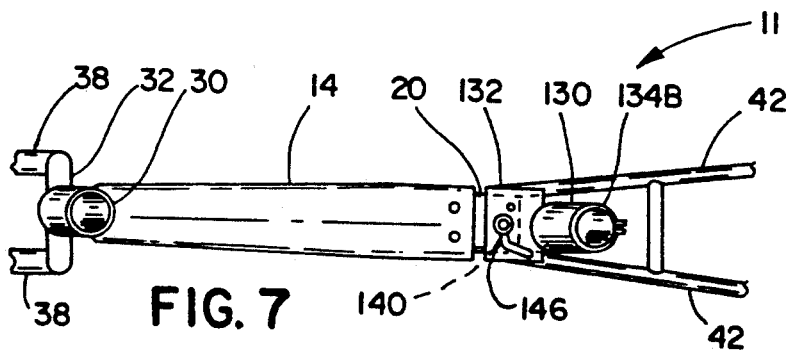
FIG. 7 is a fragmentary top view of the bicycle frame shown in FIG. 2, the frame being in the use position.
Figure 8:
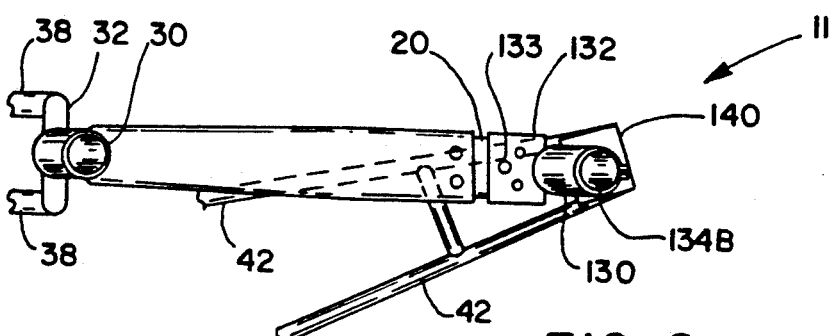
FIG. 8 is a fragmentary top view of the bicycle frame shown in FIG. 6, the frame being in the collapsed position.

In operation, bicycle 10 is folded to a compact position by removing shock-absorbing member 22 and quick connecting fastener 146, and by rotating the movable portion 16B of rear frame 16 of bicycle 10 around upper center post 130 to a compact position proximate front frame 12 (FIGS. 6, 8, and 9). This allows compact storage and shipping of bicycle 10. In turn, this allows large savings such as when shipping the bicycle on airplanes and the like. When the biker desires to use bicycle 10, the frame 11 is simply unfolded, shock-absorbing member 22 re-attached, and the quick attach bolt 136 inserted and secured (FIGS. 1, 2, and 7).

In the foregoing description, it be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A bicycle having a frame defining a longitudinal axis, front and rear wheels operably connected to and supporting said frame, and a pedal crankshaft journaled to said frame for manually propelling one of said wheels, said frame comprising:
   a rear frame member including a generally vertical center post position within an imaginary generally vertical plane extending along the longitudinal axis;
   a front frame member including a generally horizontal cross bar member positioned within said generally vertical longitudinal plane;
   a spring plate flexibly interconnecting said front and rear frame members so as to allow vertical/rotational relative movement of said frame members within said generally vertical longitudinal plane about said spring plate, said spring plate being configured so as to minimize relative movement of said frame members out of said generally vertical longitudinal planes; and
   a shock-absorbing member operably connected between said front and rear frame members and spaced from said spring plate, said shock-absorbing member being configured to limit said vertical/rotational relative movement between said frame members toward each other in a first direction about said spring plate but being configured to permit a range of said vertical/rotational relative movement between said frame members in a second direction opposite said first direction.

2. A bicycle as defined in claim 1 wherein said shock-absorbing member includes an energy-absorbing spring operably attached to said shock-absorbing member for absorbing energy as said frame members are moved within said range of said vertical/rotational relative movement in said second direction.

3. A bicycle as defined in claim 2 wherein said center post, said cross bar member, and said shock-absorbing member form a triangular arrangement.

4. A bicycle as defined in claim 3 wherein said shock-absorbing member includes first and second rigid members that are axially aligned and further includes a resilient cushioning member positioned between said rigid members.

5. A bicycle as defined in claim 4 wherein said resilient cushioning member includes a grommet.

6. A bicycle as defined in claim 2 wherein said shock-absorbing member includes a tube, and wherein said shock-absorbing member further includes a cable positioned within said tube, said cable being operably secured to said energy-absorbing spring and to one of said front and rear frame members.

7. A bicycle as defined in claim 1 wherein said center post, said cross bar member, and said shock-absorbing member form a triangular arrangement.

8. A bicycle as defined in claim 1 wherein said shock-absorbing member includes a rigid tube having an end and further includes a resilient cushioning member located at the end of said tube for cushioning but abruptly limiting the movement of said frame members in said first direction.

9. A bicycle as defined in claim 8 wherein said shock-absorbing member includes a cable positioned within said tube and extending through said resilient cushioning member, and further includes an energy-absorbing spring operably connected to said cable for absorbing energy as said frame members move within said range of vertical/rotational relative movement.

10. A bicycle as defined in claim 1 wherein said frame members, when moved in said second direction, move to an expanded position such that the front and rear wheels are positioned further apart than when in a rest position.

11. A bicycle as defined in claim 1 wherein said rear frame includes a fixed portion and a moveable portion, said fixed portion including means for securely connecting to said spring plate, said moveable portion including rear wheel supporting members for supporting the rear wheel of said bike and means for movably mounting said moveable portion to said fixed portion so that said fixed portion can be moved between a use position whereat said front and rear wheels are aligned longitudinally, and a collapsed position whereat said front and rear wheels are collapsed to a non-aligned compact position that facilitates transporting and storing the bicycle.

12. A bicycle as defined in claim 11 wherein said means for movably mounting includes an upper center post on said fixed portion and a mating axially aligned lower center post on said movable portion that mateably rotatably engages said upper center post, said upper and lower center posts forming at least a part of said center post.

13. A bicycle as defined in claim 12 including a fastener and means for receiving said fastener on said upper and lower center posts, said fastener being engageable with said means for receiving the fastener so as to secure said fixed and moveable portions in said use position both rotatably and axially.

14. A bicycle having a frame defining a longitudinal axis, front and rear wheels operably connected to and supporting said frame, and a pedal crankshaft journaled to said frame for manually propelling one of said wheels, said frame comprising:

a rear frame member including a generally vertical center post positioned within an imaginary generally vertical plane extending along the longitudinal axis;

a front frame member including a generally horizontal cross bar member positioned within said generally vertical longitudinal plane;

means for interconnecting said front and rear frame members so as to allow vertical/rotational relative movement of said frame members within said generally longitudinal planes, but so as to minimize relative movement of said frame members out of said generally vertical longitudinal planes; and a shock-absorbing member including opposing ends pivotally connected to said front and rear frame members, said shock-absorbing member forming with said center post and said cross bar member a triangular arrangement, said shock-absorbing member being configured to prevent movement of said opposing ends toward each other and thus being configured to limit said vertical/rotational relative movement between said frame members in a first collapsing direction about said means for interconnecting said front and rear frame members, but being configured to permit movement of said opposing ends away from each other over a predetermined range to thus permit a predetermined amount of said vertical/rotational relative movement between said frame members in a second expanding direction opposite said first collapsing direction.

15. A bicycle as defined in claim 14 wherein said means for interconnecting includes a spring plate.

16. A bicycle as defined in claim 14 wherein said shock-absorbing member includes an energy-absorbing spring operably attached to said shock-absorbing member for absorbing energy as said frame members are moved within said predetermined range of said vertical/rotational relative movement in said second expanding direction.

17. A bicycle as defined in claim 14 wherein said shock-absorbing member includes first and second rigid members that are axially aligned and further includes a resilient cushioning member positioned between said rigid members.

18. A bicycle as defined in claim 14 wherein said shock-absorbing member includes a tube, and wherein said shock-absorbing member further includes a cable positioned within said tube.

19. A bicycle as defined in claim 14 wherein said rear frame includes a fixed portion and a movable portion, said fixed portion including a tubular member forming a part of said center post, said movable portion including rear wheel supporting members for supporting the rear wheel of said bicycle and means for movably mounting said movable portion to said fixed portion so that said movable portion can be moved between a use position whereat said front and rear wheels are aligned longitudinally, and a collapsed position whereat said front and rear wheels are collapsed to a non-aligned compact position that facilitates transporting and storing the bicycle.

20. A bicycle as defined in claim 19 wherein said movable portion includes a second tubular member, said second tubular member fitting axially rotatingly and snugly onto said first tubular member and defining at least part of said means for movably mounting said movable portion to said fixed portion.

21. A bicycle frame comprising:
a front frame including a cross bar;
a rear frame including a center post;
a leaf-spring-like flexible member interconnecting said cross bar to said center post; and
a flex limiting member attached to said front frame and to said rear frame at locations spaced from said flexible member in an arrangement configured to limit the flexural movement of said flexible member, said flex limiting including opposing ends and being configured to curtail movement of said opposing ends toward each other, but being configured to permit extension of said opposing ends from each other over a predetermined range to thus effectively limit and control the amount of flex that can be given said flexible member.

22. A bicycle as defined in claim 21 wherein said flex limiting member includes a cable and a coil spring, the coil spring being operably attached to said cable and to said flex limiting member so that, as said flex limiting member is flexed within said range and said flexible member undergoes flexural movement, said coil spring absorbs energy, which energy is returned to the bicycle frame upon relaxation of said flexible member, said flex limiting also including a rigid tube for limiting the movement of said opposing ends toward each other, said tube being operably connected between said front and rear frame, said cable being positioned at least partially within said tube.

23. A bicycle as defined in claim 21 wherein said rear frame includes a rear wheel supporting subassembly having a pivot tube, said pivot tube being axially mounted on said center post for rotational movement about said center post so that said rear wheel supporting subassembly can be rotated between an extended use position whereat the front and rear wheels are aligned, and a collapsed storage position whereat the frame is folded into a more compact arrangement for shipment and storage.

24. A bicycle frame comprising:
a front frame including a cross bar, means for operably supporting a front wheel, and a front wheel;
a rear frame including a center post, means for operably supporting a rear wheel including rear-wheel supporting members, and a rear wheel;
a flexible member interconnecting said cross bar to said center post;
said rear frame including a fixed portion and a rotatable portion rotatably secured to said fixed portion so that said rotatable portion can be moved between a use position whereat said front and rear wheels of said bicycle are aligned longitudinally and a collapsed position whereat said front and rear wheels are collapsed to a non-aligned compact position that facilitates transporting and storing the bicycle; and
means for securing said rotatable portion to said fixed portion in said use position.

25. A bicycle as defined in claim 24 wherein said fixed portion includes a first tubular member forming a part of said center post, and said rotatable portion includes said rear-wheel-supporting members and further includes a second tubular member fitting axially, rotatingly and snugly into said first tubular member.

26. A bicycle as defined in claim 25 wherein said rotatable portion includes a third tubular member secured axially on said second tubular member, said second and third tubular members reinforcing each other and said first and third members abuttingly engaging each other.

27. A bicycle as defined in claim 26 wherein fixed portion includes a first connector for connecting to said flexible member, and wherein said rotatable portion includes a second connector alignable with said first connector when said rotatable portion is in said use position, and said means for securing said rotatable portion to said fixed portion includes a fastener engageable with said first and second connectors for securing said first and second connectors together.

28. A bicycle as defined in claim 27 wherein said second connector is a plate extending between said rear-wheel-supporting members, said first and second connectors including alignable holes, said fastener including a shaft extendable through said alignable holes for securing said rotatable portion to said fixed portion in the use position.

* * * * *